Figure 1:
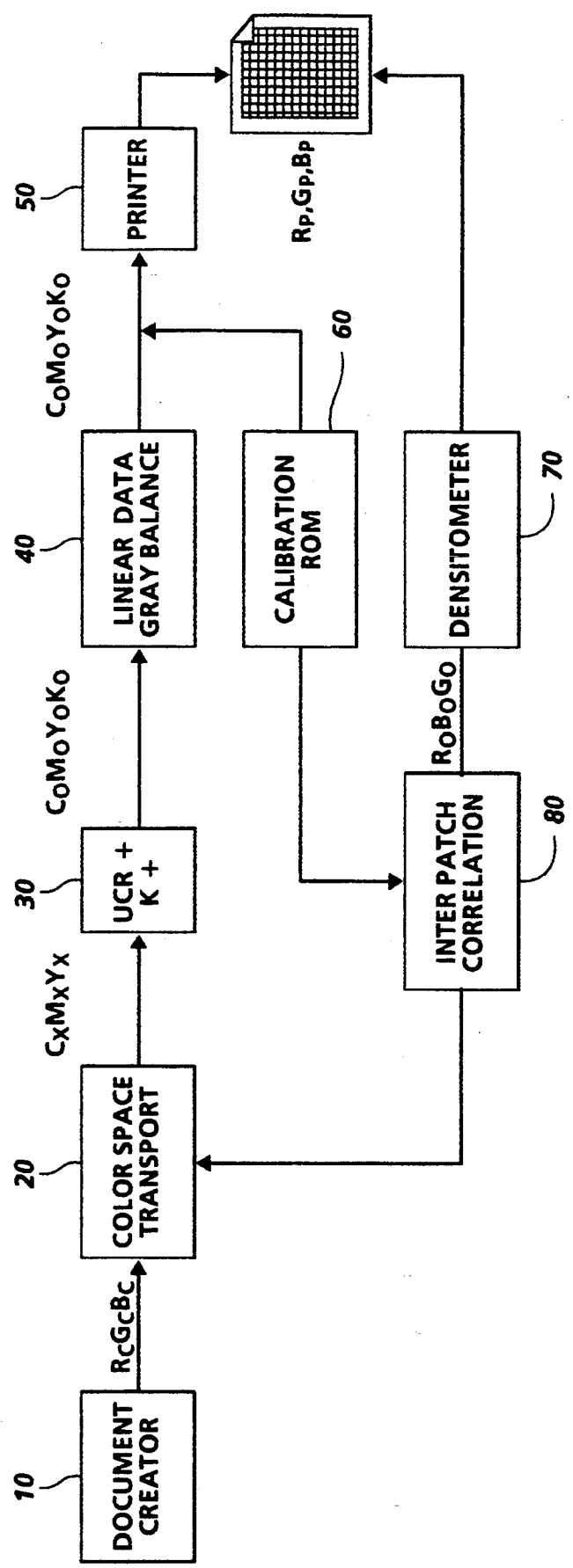

United States Patent [19]

Rolleston et al.

[11] Patent Number: 5,416,613
[45] Date of Patent: May 16, 1995

[54] COLOR PRINTER CALIBRATION TEST PATTERN

[75] Inventors: Robert J. Rolleston, Penfield; Martin S. Maltz; Judith E. Stinehour, both of Rochester, all of N.Y.

[73] Assignee: Xerox Corporation, Stamford, Conn.

[21] Appl. No.: 144,987

[22] Filed: Oct. 29, 1993

[51] Int. Cl.⁶ .................... H04N 1/00; H04N 1/46; G01J 1/02
[52] U.S. Cl. .................... 358/518; 358/500; 358/504; 358/406; 356/243
[58] Field of Search .............. 358/500, 501, 502, 504, 358/506, 518, 527, 406; 355/38, 35, 32; 356/243, 421; 348/188, 175, 177, 182

[56] References Cited

U.S. PATENT DOCUMENTS

| | | | |
|---|---|---|---|
| 2,790,844 | 4/1957 | Neugebauer | 178/5.2 |
| 4,275,413 | 6/1981 | Sakamoto et al. | 358/80 |
| 4,310,248 | 1/1982 | Meredith | 356/402 |
| 4,500,919 | 2/1985 | Schreiber | 358/78 |
| 4,841,360 | 6/1989 | Birgmeir | 358/280 |
| 5,060,013 | 10/1991 | Spence | 355/208 |
| 5,062,714 | 11/1991 | Peterson | 356/406 |
| 5,107,332 | 4/1992 | Chan | 358/518 |
| 5,227,815 | 7/1993 | Dastin | 346/160 |

FOREIGN PATENT DOCUMENTS

WO92/01264 9/1992 WIPO .................... G06F 15/62

OTHER PUBLICATIONS

Po-Chieh Hung, "Tetrahedral Division Technique Applied to Colorimetric Calibration for Imaging Media", Annual Meeting IS&T, NJ, May, 1992, pp. 419–422.
Po-Chieh Hung, "Coloimetric Calibration for Scanners and Media", SPIE, vol. 1448, Camera and Input Scanner System (1991).
Sigfredo I. Nin et al, "Printing CIELAB Images on a CMYK Printer Using Tri ∝ Linear Interpolation", SPIE Proceedings, vol. 1670, 1992, pp. 316–324.
William J. Gordon et al, "Shepard's Method of 'Metric Interpolation' to Bivariate and Multivariate Interpolation", Mathematics of Computation, vol. 32, No. 141, Jan. 1978, pp. 253–264.
Kodak Ektacolor Plus Paper Reproduction Guide Q–60C.
Ofoto ® Adaptive Calibration Color Chart.
Candela's SYS–CAL.

Primary Examiner—Edward L. Coles, Sr.
Assistant Examiner—Allan A. Esposo
Attorney, Agent, or Firm—Mark Costello

[57] ABSTRACT

A method of calibrating the response of the printer to an image described in terms of colorimetric values, including the steps of: a) setting printer parameters; b) deriving a printer response characteristic by printing a calibration test from device dependent printer signals stored in a device memory, the calibration image including a plurality of color patches, some of which may be repeated at a plurality of locations on the test image at spatially disparate locations selected to keep local printer non-uniformities from affecting both locations; c) measuring printer response characteristics in device independent terms; d) generating a memory mapping of device independent colors to printer responses for subsequent use in printing images defined in device independent terms. The calibration target includes a large number of patches generated from combinations of printer colorants, and may repeat some of those patches either on the same sheet or on a plurality of sheets at positions on the sheet which are spatially distinct.

4 Claims, 2 Drawing Sheets

COLOR PRINTER CALIBRATION TEST PATTERN

CROSS REFERENCE

Cross reference is made to the following co-pending applications: U.S. Ser. No. 07/955,075, filed Oct. 1, 1992, entitled "Color Printer Calibration Architecture", by R. J. Rolleston et al. (assigned to the same assignee as the present application); and U.S. Ser. No. 08/131,168, filed Oct. 4, 1993, entitled "Reduced Storage of Pre-Computed Difference Tables Used in Color Space Conversion", by R. J. Rolleston (assigned to the same assignee as the present application).

The present invention is directed to a printer calibration system for calibrating a printer to produce an accurate printer response based on a given ideal input image, and more particularly to a calibration test target or pattern which, when used in association with the calibration system, mitigates the affects of printer non-uniformities occurring across the spatial and/or temporal domain of a printed test target sheet.

INCORPORATION BY REFERENCE

The following patents are specifically incorporated by reference: U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system.

BACKGROUND OF THE INVENTION

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Color corrected scanners commonly operate with colors defined in a color space of tristimulus values, i.e., RGB (red-green-blue). Commonly, these values are a linear transformation of the standard XYZ coordinates of CIE color space, or a correct transform of those values. In the case of computer generated images, colors defined by the user at the user interface of his workstation are immediately converted into color space values and directed out of the system as defined in the document colors.

Printers have an output which can be defined as existing in a color space called CMYK (cyan, magenta, yellow, key or black) which is uniquely defined for the printer by its capabilities and colorants. Printers operate by the addition of multiple layers of ink or colorant in layers or halftone dots to a page. The response of the printer tends to be non-linear. Thus, while a printer receives information in a first color space which has values defined independently of any device, it must convert that information to print in a second color space.

The desirability of operating in a tristimulus color space with subsequent conversion to a printer colorant color space is well known, as shown by U.S. Pat. No. 4,500,919 to Schreiber, U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of color input values, the values are printed in normal operation of the printer, and measurements are made of those colors to determine what the actual color printed was in response to the color specification. As previously noted, most printers have non-linear response characteristics.

The calibration of a printer involves the process of finding what set of signals must be sent to a printer to obtain a desired color. The desired color is described in some device independent terminology (i.e. some well defined standard), and the signals to the printer constitute a device dependent terminology. A complete calibration will transform the device independent color description into a device dependent description such that the resultant combination of materials (i.e. ink, toner, dye, etc.) on the paper produces the desired color (i.e. the color which was initially described in a device independent fashion).

The final stage of the calibration requires the establishment of a color correction transformation. This is currently done by printing and measuring 1000 ($10 \times 10 \times 10$) or 512 ($8 \times 8 \times 8$) patches distributed throughout the color space. These patches are used to build a three dimensional look-up-table (LUT) which is used with tetrahedral interpolation.

In U.S. Pat. No. 4,500,919 to Schreiber, and U.S. Pat. No. 4,275,413 to Sakamoto, the information derived from patch measuring was placed into look-up tables, stored in a memory, perhaps ROM memory or RAM memory where the look-up table relates input color space to output color space. The look-up table is commonly a three dimensional table since color space is three dimensional. With a scanner or computer, the RGB space can be defined as three dimensional with black at the origin of a three dimensional coordinate system (0,0,0), and white at the maximum of a three dimensional coordinate system which an 8-bit system, would be located at (255, 255, 255). Each of the three axes radiating from the origin point therefore respectively define red, green, and blue. A similar construct can be made for the printer, with axes representing cyan, magenta, and yellow. Black is usually a separate toner which is added separately. In the 8-bit system suggested there will be, however, over 16 million possible colors ($256^3$) There are clearly too many values for a 1:1 mapping of RGB to CMYK. Accordingly, as proposed in U.S. Pat. No. 4,275,413 to Sakamoto, only a relatively small number of samples are made at the printer, perhaps on the order of 1,000, or even less. Therefore, the look-up tables consist of a set of values which could be said to be the intersections for corners of a set of rectangular parallel-pipeds mounted on top of one another. Colors falling within each rectangular volume can be interpolated from the measured values, through many methods including tri-linear interpolation, tetrahedral interpolation, polynomial interpolation, linear interpolation, and any other interpolation method depending on the accuracy of the desired result.

A common approach to accomplishing calibration of a print system is by generating a set of color patches distributed in color space; printing the patches (in output color space) in a desired output medium like a paper sheet and measuring the color of the patches, typically with a high accuracy densitometer, spectrophotometer or the like to determine what was printed in terms of an input color space. This data can then be loaded into a look-up table. However, it will undoubtedly be understood that some printer variations occur across the spatial domain of any printed sheet as a result of photoreceptor variation, thermal hysteresis or exposure non-uniformity, etc. When this happens, it is impossible to tell if the variation in color is due to a variation in the printer's response to a given signal or if the variation is due to some non-uniformity across the sheet. In a large set of cases, the non-uniformity repeats when the page is reprinted. The characterization of the device would be in error because the system will attribute spatial uniformity problems to variation in colorimetric response.

U.S. Pat. No. 5,227,815 to Dastin shows a color registration test pattern, printed cyan, magenta, yellow and black, used for determining the registration of a multiple developer xerographic system. A test pattern from Eastman Kodak Company entitled "KODAK EKTACOLOR PLUS Paper Reproduction guide Q-60C is a color chart in which colors vary uniformly from one color to the next color. Accordingly, colors that are very similar to one another are placed very close to each other. A similar test pattern from Light Sources Computer Images, Inc, entitled "OFOTO ® Adaptive Calibration Color Chart" is a color chart in which colors vary uniformly from one color to the next color. Again, colors that are very similar to one another are placed very close to each other in the test pattern. Accordingly a localized color distortion will tend to affect all the colors tested for that area. Note also WO-92/01264, which describes system calibration. Finally, a test target that is a part of Candela's SYS-CAL product shows randomized colors, for calibrating a scanner, and accordingly does not appear to address the problem of localized printer distortions.

All of the references cited herein are incorporated by reference for their teachings.

SUMMARY OF THE INVENTION

In accordance with the invention, in a printer which produces images as a function of the combination of cyan (C), magenta (M), yellow (Y) and black (K) colorants on an output print, there is provided a simplified calibration chart improving estimates of printer response at various colors.

In accordance with one aspect of the invention, in a printer which produces images as a function of the combination of printer colorants on an output print, responsive to device independent colorimetric description of an image, there is provided a method of calibrating the response of the printer to an image described in terms of colorimetric values, including the steps of a) setting printer parameters; b) deriving a printer response characteristic by printing a calibration test from device dependent printer signals stored in a device memory, the calibration image including a plurality of color patches, at least some of which are repeated at a plurality of locations on the test image at spatially disparate locations selected to avoid local printer non-uniformities from affecting both locations; 3) measuring printer response characteristics in device independent terms; 4) generating a memory mapping of device independent colors to printer responses for subsequent use in printing images defined in device independent terms.

In accordance with another aspect of the invention, the calibration target includes a large number of patches generated from combinations of printer colorants, and may repeat at least some of those patches either on the same sheet or on a plurality of sheets at positions on the sheet which are spatially distinct.

In accordance with another aspect of the invention, in a printer system calibration process, printer response is measured using a calibration target including a large number of patches generated from combinations of printer colorants, and repeating at least some of those patches either on the same sheet or on a plurality of sheets at positions on the sheet which are spatially distinct. Printer response is correlated between patches to determine a best characterization of printer response.

By repeating colors at positions on the sheet which are spatially distinct, the colorimetric response of the printer is uncoupled from local non-uniformities that are a function of printer performance.

Figure 2:
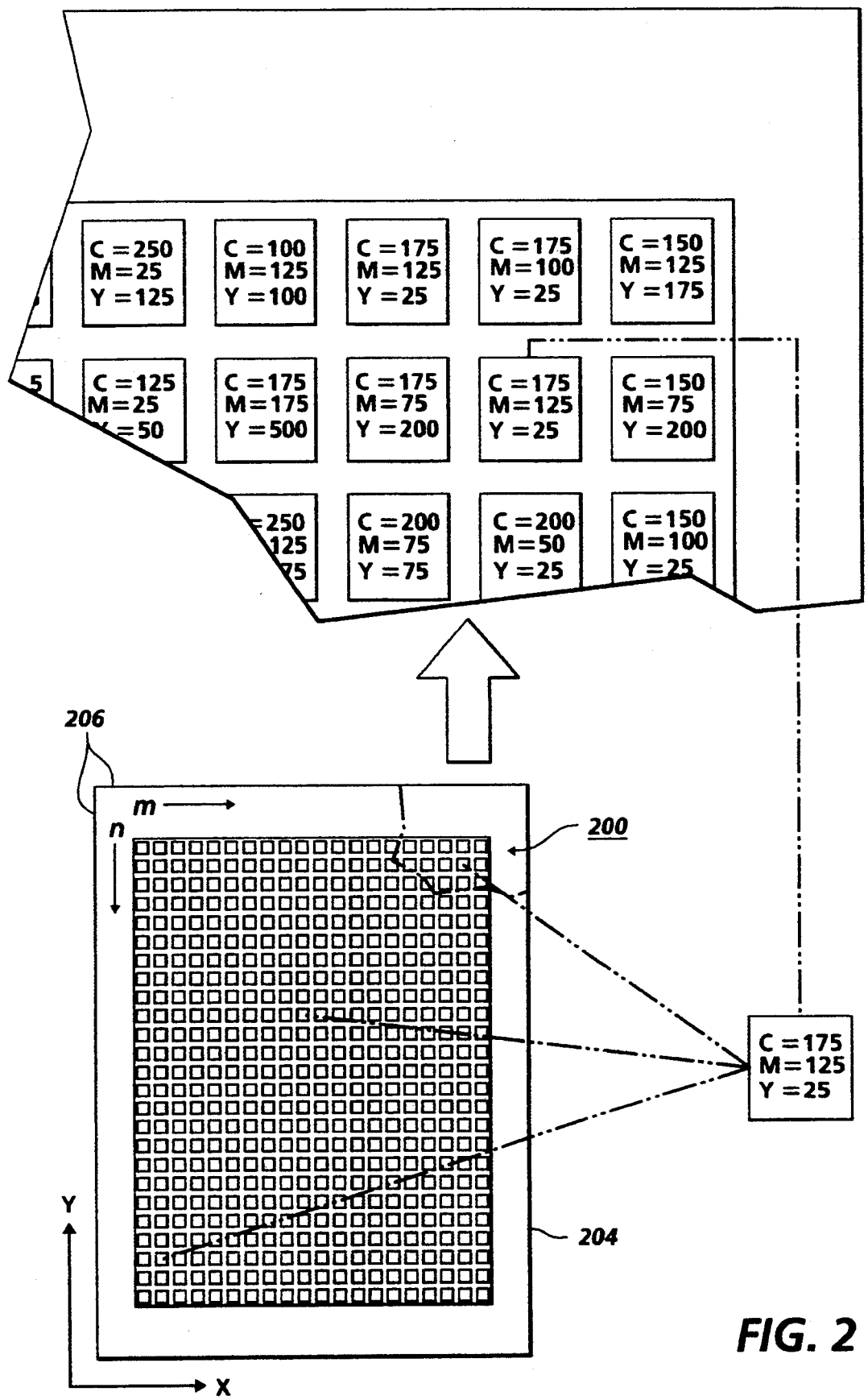

These and other aspects of the invention will become apparent from the following descriptions to illustrate a preferred embodiment of the invention read in conjunction with the accompanying drawings in which:

FIG. 1 is a block diagram of a printing system with color transformation, for converting device independent image descriptions to device dependent image descriptions; and FIG. 2 is a simplified illustration of a calibration test target in accordance with the invention.

Referring now to the drawings where the showings are for the purpose of describing an embodiment of the invention and not for limiting same, a basic system for carrying out the present invention is shown in FIG. 1. Generally, a source of images, in this case shown as a computer workstation or document creator 10 provides an image defined in colorimetric terms, typically digital in nature $R_c$, $G_c$, $B_c$. Commonly this description may be part of a Page Description Language (PDL) file describing the document in device independent terms. The colorimetric terms may reference CIE color space (L*a*b* for example), colorimetric RGB, luminance-chrominance space ($LC_1C_2$), etc. A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant values $C_x$, $M_x$, $Y_x$. Commonly, color space transform 20 is a look-up table, receiving as addresses or indexes device independent signals describing the image, and producing as a responsive output a device dependent signal. In an example 8 bit per pixel/separation system, over 16 million mappings would be required. Accordingly, coupled with the look-up table is an interpolation arrangement, such as described in U.S. Pat. No. 4,275,413 to Sakamoto, or in copending U.S. patent application Ser. No. 08/131,168, filed Oct. 4, 1993, entitled "Reduced Storage of Pre-Computed Difference Tables Used in Color Space Conversion" by R. Rolleston, which provides interpolated output colors as an interpolated function of the closest mapped output colors. In one possible example, the colorant values represent the relative amounts of cyan, magenta and yellow toners that are to be deposited over a given area in an electrophotographic printer, such as the Xerox 4700 digital color printer. The printed output image may be said to be defined in terms of $R_p$, $G_p$, $B_p$, which is hoped to have a relationship with $R_c$, $G_c$, $B_c$ such that the printed image has a color that is colorimetrically similar to the original image, although similarity is ultimately dependent upon the gamut of the printing device.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, NJ, May, 1992, pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324.

With reference again to FIG. 1, in the example system, upon obtaining device dependent colorant signals $C_x$, $M_x$, $Y_x$, under color removal and black addition (K+) is performed at UCR and K+30.

Subsequent to black addition, at linearization and gray balance 40, the color values are linearized, so that linearly increasing values of colorants produce a linearly increasing colorimetric response. The linearization process is implemented via a set of look-up tables storing the responses of a set of patches generated at a set of input values, where a curve fitting routine is used to map the set of possible input responses to characterized output responses. Rather than linearizing the color values, so that linearly increasing values of colorants produce a linearly increasing colorimetric response, the color values may be gray balanced, so that equal amounts of color produce a neutral gray response at the printer. The gray balance process is also implemented via a set of look-up tables storing the responses of a set of patches generated at a set of input values, where a curve fitting routine is used to map the set of possible input responses to characterized output responses. Whichever system is used, the new values $C_p$, $M_p$, $Y_p$, $K_p$ are then used to drive printer 50.

With reference now to FIG. 2, to create the color transformation table requires printing a calibration image 200 set of color patches 202$a$, $b$, $c$, . . . . . In this context, a patch 202 is a small area of printed colorant having a perceived uniform color throughout. In our embodiments, a patch is separated from adjacent patches with white and/or black lines. The calibration image 200 is generated by printing a large number, on the order of a 1000 (10 cyan densities×10 magenta densities×10 yellow densities), of patches of colors distributed throughout printer color space, i.e., a large set of printer driving signals are generated, in varying densities of combinations of cyan, magenta and yellow, and used to drive the printer. Other CMY combinations of interest (e.g. skin tones, or other memory colors) may also be included.

With reference to FIG. 1, the color of each patch will be measured, using a spectrophotometer or densitometer 70 to determine color in terms of $R_cB_cG_c$. The measured colors of these patches are used to build a three dimensional look-up table (LUT) relating $R_cB_cG_c$-defined colors to $C_xM_xY_x$-defined colors stored at color space transform 20. Conversions that do not include mapped and measured points may be interpolated from the measured data.

As noted, the colors are dispersed through color space, in an attempt to provide measurements through the entire printer gamut of colors. The calibration image 200 may be printed on one or more sheets of receiving material 204 (a substrate), which may be paper, transparencies or the like, with an understood optical response. An array of patches is printed, in an m×n array, with about a 1000 colors (although as few as 500 and as many as 4000 have been used), such a number being selected as providing a reasonable tradeoff of good interpolation results with a reasonable data set size for storage and handling. The limits of the printed array are spaced slightly inward from the edges 206 of the receiving material or substrate 204 to avoid edge effect non-uniformities common in printers. In one embodiment of the invention, the calibration image is printed on 8.5"×11" paper and includes an array of 20×25 (500) patches in a field measuring about 7" by 9". The physical layout of the page is also suggested by a desire to have a user review the printed page to assure that it is a good print, and by the densitometer system, which may include an automatic indexing system for scanning through the document to measure each color. The target may therefore have registration marks to facilitate automatic scanning. It will of course be recognized that the receiving material or substrate used should represent one on which images will be made in the future, and the receiving material or substrate used should also be acceptable for use in the printer, so as not to cause printer non-linearity by its use.

As illustrated in FIG. 2, the pattern appears to be random or at least uncorrelated from patch to patch. Randomness also aids in assuring that printer non-uniformities do not affect, for example, all the colors located in one region of color space. The pattern is only pseudo random, however, as at least some of the colors forming the calibration image are printed more than once, with each repeat of the color at a different position on the sheet as illustrated for colors 202$a$, 202$b$, and 202$c$ which are all value c=175, M=125 and Y=25 (black is added by the K+addition process based on the minimum density colorant, in this case Y). If the process direction is parallel to the x-axis shown and the cross process direction is parallel to the y-axis shown, the repeated colors may be printed as plural positions along the x-axis. In conjunction with dispersal across the x-axis, there may be reasons to disperse the repeated colors across the y axis as well.

With reference again to FIG. 1, calibration image 200 is conveniently stored in device memory such as calibration ROM 60, RAM, floppy or the like, or are generated on the fly with a predetermined generation function. Signals stored therein are directed to the printer under the control of printer controller 65.

Densitometer or spectrophotometer 70 is used to scan the calibration target and produce $R_oG_oB_o$ signal values as a function of sensed density, representing the colors of each scanned patch. The output is organized in a fashion providing location information with device independent color information.

Interpatch correlation processor 80 reads the responses provided from densitometer 70 for each location in the calibration target and correlates the response with the input CMY signals, so that an $R_cG_cB_c$ to CMY mapping is generated. Further, for repeated patches at a plurality of locations, interpatch correlation processor averages the signals to produce a response that takes into account spatial non-uniformities. It will no doubt be appreciated that while in the described embodiment multiple patch response signals are averaged, other processing could take place which might provide different processing. For example, statistical evaluation of repeated patches could be provided, with non-conforming data ignored. The interpatch correlation processor directs the corrected signals for storage in the LUT of color space transform 20, for use in printing.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A calibration arrangement for calibrating a color printer, comprising:
   - a multi-color printer responsive to electronic signals to print combinations of a plurality of colorants approximating cyan, magenta, yellow and black on a substrate;
   - a memory suitable to store electronic signals suitable to drive the color printer to reproduce a calibration image, said calibration image including:
     a plurality of patches organized in a pseudo random pattern, said plurality of patches to be printed on said substrate with combinations of primary subtractive colorants and representing a set of possible colors dispersed through printer color space, every color in the set of printed colors repeated at least twice in the calibration image, at spatially disparate locations on said substrate; and
   - a printer controller, controlling the printer to print the calibration image during calibration operations;
   - a densitometer suitable for measuring colorimetric response of the printer in printing the calibration image on the substrate in terms of device independent colorimetrics;
   - a device memory storing a look-up table relating device independent colors to printer colorants derived from the densitometer colorimetric measurements of printer response;
   - means for converting device independent color information to printer colorant signals, using the look-up table stored in device memory.

2. The device as defined in claim 1 wherein the substrate is plural sheets of paper.

3. The device as defined in claim 1 where said memory is a read only memory integrated into a controller for the multi-color printer.

4. The device as defined in claim 1, wherein said set of possible colors dispersed through printer color space includes between 500 and 4000 colors.

* * * * *